(12) United States Patent
Van Der Werff et al.

(10) Patent No.: US 11,446,869 B2
(45) Date of Patent: Sep. 20, 2022

(54) RECOATING DEVICE AND METHOD FOR APPLYING A LAYER OF BUILD MATERIAL CAPABLE OF SOLIDIFICATION ON A WORKING SURFACE

(71) Applicant: Nederlandse Organisatie voor toegepast-natuurwetenschappelijk onderzoek TNO, 's-Gravenhage (NL)

(72) Inventors: Jeichienus Johannes Van Der Werff, Sterksel (NL); Edwin Adrianus Cornelius Van Den Eijnden, Geldrop (NL); Hendrik Abraham Buining, Nuenen (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/271,524

(22) PCT Filed: Sep. 13, 2019

(86) PCT No.: PCT/NL2019/050598
§ 371 (c)(1),
(2) Date: Feb. 25, 2021

(87) PCT Pub. No.: WO2020/055255
PCT Pub. Date: Mar. 19, 2020

(65) Prior Publication Data
US 2021/0362413 A1 Nov. 25, 2021

(30) Foreign Application Priority Data

Sep. 14, 2018 (EP) ........................................ 8194399

(51) Int. Cl.
*B29C 64/214* (2017.01)
*B33Y 10/00* (2015.01)
(Continued)

(52) U.S. Cl.
CPC .......... *B29C 64/214* (2017.08); *B29C 64/329* (2017.08); *B33Y 10/00* (2014.12); *B33Y 30/00* (2014.12); *B29C 64/153* (2017.08)

(58) Field of Classification Search
CPC ... B29C 64/205; B29C 64/214; B29C 64/329; B33Y 10/00; B33Y 30/00
See application file for complete search history.

(56) References Cited

U.S. PATENT DOCUMENTS 9,956,612 B1\* 5/2018 Redding ................ B29C 64/268
2014/0065194 A1\* 3/2014 Yoo ......................... B33Y 40/00
425/375

(Continued)

FOREIGN PATENT DOCUMENTS

EP 2986405 2/2016
WO WO 2014/170127 A1 10/2014

(Continued)

OTHER PUBLICATIONS

European Patent Office, International Search Report in corresponding International Application No. PCT/NL2019/050598, dated Nov. 11, 2019 (3 pages).

*Primary Examiner* — Mary Lynn F Theisen
(74) *Attorney, Agent, or Firm* — Leydig, Voit & Mayer, Ltd.

(57) ABSTRACT

A recoater for applying a layer of build material capable of solidification on a working surface, wherein the recoater comprises a discharge port and a flattening member, wherein the discharge port is configured to discharge build material to form a heap of build material ahead of the flattening member, wherein the flattening member is configured to spread material from the heap of build material along the working surface in order to form the layer of build material on top of the working surface through a gap formed between a lower surface of the flattening member and the working (Continued)

surface by relative movement of the flattening member and the working surface, wherein the recoater further includes a shutter distanced from the discharge port, wherein the shutter is configured to be movable between a closed position in which build material is not dispensed onto the working surface, and an opened position in which build material is dispensed onto the working surface, wherein the shutter is configured to close an adjacent area ahead of the lower surface of the flattening member in the closed position.

14 Claims, 14 Drawing Sheets

(51) Int. Cl.
 B33Y 30/00 (2015.01)
 B29C 64/329 (2017.01)
 B29C 64/153 (2017.01)

(56) References Cited

U.S. PATENT DOCUMENTS

| | | |
|---|---|---|
| 2014/0175708 A1* | 6/2014 | Echigo ................ B29C 64/194 |
| | | 264/460 |
| 2017/0066190 A1 | 3/2017 | Klein et al. |
| 2018/0085856 A1 | 3/2018 | Bour et al. |
| 2020/0254566 A1* | 8/2020 | Mamrak ............ B23K 15/0086 |
| 2021/0370394 A1* | 12/2021 | Redding ................ B22F 5/009 |

FOREIGN PATENT DOCUMENTS

| | | |
|---|---|---|
| WO | WO 2016/030417 A1 | 3/2016 |
| WO | WO 2016/161489 A2 | 10/2016 |
| WO | WO 2017/205289 A1 | 11/2017 |
| WO | WO 2018/056988 A1 | 3/2018 |
| WO | WO 2018/067336 A1 | 4/2018 |

* cited by examiner

RECOATING DEVICE AND METHOD FOR APPLYING A LAYER OF BUILD MATERIAL CAPABLE OF SOLIDIFICATION ON A WORKING SURFACE

CROSS-REFERENCE TO RELATED APPLICATIONS

This patent application is a U.S. National Phase of PCT International Application No. PCT/NL2019/050598, filed Sep. 13, 2019, which claims priority to European Application No. 18194399.4 filed Sep. 14, 2018, which are both expressly incorporated by reference in their entireties, including any references contained therein.

FIELD OF THE INVENTION

The invention relates to a recoating device and method for applying a layer of build material capable of solidification on a working surface. The invention further relates to an additive manufacturing system and a use of a recoater in an additive manufacturing system or process.

BACKGROUND TO THE INVENTION

In the field of additive manufacturing there are a variety of ways in which to create an object. Typically, complex three-dimensional solid objects can be made by repeatedly laying down thin layers of build material capable of solidification, one layer at a time through the use of (re-)coating means and subsequently selectively solidifying portions of the applied thin layers. The build material may for instance be a material curable by means of light (e.g. ultraviolet) or a material which can be thermally hardened, e.g. melted, fused and/or sintered together, by means of electromagnetic radiation (e.g. laser light, electron beam, etc.).

The objects can be made quickly without requiring complex or cumbersome tooling. In a layering process build material is spread into a layer and selectively solidified according to predetermined patterns, wherein the layering process is followed by spreading of additional build material into another successive layer which is similarly selectively solidified. This process is repeated for a number of times to build up a three-dimensional part. A computer can be employed for generating the cross section of patterns. The additive manufacturing system can be readily linked to CAD/CAM systems.

Recoating is used in additive manufacturing for applying a thin layer of medium. The medium, which is used as building material for the to be formed object, can be a powder. However, liquids may also be used, such as for example (polymer) resins.

Deposition of a thin layer of build material can be performed in various ways using a recoater. For example, a recoating geometry like an applicator, blade or knife can be used to deposit the thin resin layers. A blade recoater may be brought in direct contact with the build medium and swept across the build material surface in order to deposit a uniform layer having a desired layer thickness. However, known recoating devices can result in an inaccurate or time consuming layer deposition.

Typically, conventional additive manufacturing recoating devices, for example employed in selective laser melting/sintering machines, are moved over a build surface, wherein excess powder that is pushed ahead of the recoater on either side is collected in waste pockets. Such waste pockets of a build unit can make the system more complex and spacious. Furthermore, a significant amount of the build material is not used and ends up in the waste pockets.

There is a need for a (re)coating means which enables a more efficient additive manufacturing process with a reduced waste of build material during recoating. Furthermore, there is a need for a (re)coating means allowing an accurate deposition of a (thin) layer of build material.

SUMMARY OF THE INVENTION

It is an object of the invention to provide for a method and a system that obviates at least one of the above mentioned drawbacks.

Additionally or alternatively, it is an object of the invention to provide for an improved (re)coating means in an additive manufacturing system or method.

Additionally or alternatively, it is an object of the invention to provide for a (re)coater for applying a layer of build material with less waste of said build material.

Additionally or alternatively, it is an object of the invention to provide for a device and a method that enables an efficient, accurate, stable and/or uniform deposition of a successive layer of medium.

Thereto, the invention provides for a recoater for applying a layer of build material capable of solidification on a working surface, wherein the recoater comprises a discharge port and a flattening member, wherein the discharge port is configured to discharge build material to form a heap of build material ahead of the flattening member, wherein the flattening member is configured to spread material from the heap of build material along the working surface in order to form the layer of build material on top of the working surface through a gap formed between a lower surface of the flattening member and the working surface by relative movement of the flattening member and the working surface, wherein the recoater further includes a shutter distanced from the discharge port, wherein the shutter is configured to be movable between a closed position in which build material is not dispensed onto the working surface, and an opened position in which build material is dispensed on the working surface, wherein the shutter is configured to close an adjacent area ahead of the lower surface of the flattening member in the closed position.

Instead of closing off the opening area of the discharge port, the flow of build material, preferably powder, is interrupted by means of a shutter located at a distance from said opening area, so that the heap is not constrained in a sideways direction. The shutter may for instance have a sliding blade several centimeters away of the outflow opening of the discharge port. The shutter of the recoater may provide for an improved shut-off mechanisms, without requiring closing off the powder stream directly at the outflow opening area of the discharge port.

Advantageously, instead of carrying the remaining heap of build material over an edge into a waste bin or surplus reservoir, the heap of build material can be retained for later use. This may be very advantageous, when the recoater is used in an additive manufacturing system having a conveyer a plurality of build units moveable along the conveyor, wherein one or more of the plurality of build units are arranged to subsequently pass along the recoater by means of the conveyor.

The shutter may be configured to provide a closing mechanism enabling an accurate and/or sudden cut-off of the deposition of the layer of build material. The recoater may for instance be used for applying a layer of powder. The flow of powder is not directly closed at an outflow opening of the discharge port. Instead, a shutter is arranged in front of the flattening member at substantially a same level of a formed powder bed. The powder flow can be stopped by means of the shutter when the shutter closes the adjacent area. The heap of powder can thus remain substantially intact for later use during successive recoating.

A powder bed may be very sensitive to density variations (e.g. polymer or metal powder). The density of the powder bed is very important for the end quality of the manufactured objects and products. The density may largely be determined by the mass of the heap of powder ahead of the flattening member (e.g. blade, roller, etc.). Advantageously, the recoater with the shutter may achieve recoating wherein the amount of powder ahead of the flattening member can remain substantially constant, while the powder flow can be completely stopped and started again. It will be appreciated that the build material may also be a liquid instead of a powder.

The adjacent area being closed off by means of the shutter, in the closed position, can be at a height of the lower surface of the flattening member. The shutter may be configured such that at least in the closed position the lower surface of the shutter is aligned with the lower surface of the flattening member.

The heap of build material ahead of the flattening member in the relative direction of movement direction can be formed through the discharge port. The discharge port may be configured to controllably allow build material to be ejected from the build material reservoir (e.g. hopper) ahead of the flattening member of the recoater. Advantageously, the build material ejection does not need to be precise as to location or timing as it is the flattening member which distributes the build material across the working surface to a depth defined by the gap/clearance between the blade and the working surface.

The build material (e.g. powder) can be spread by the flattening member of the recoater by relatively sweeping a pile/heap of build material across the working surface in order to form the layer of build material. The heap of build material can be formed in front of the flattening member, i.e. ahead (upstream) of the flattening member in the direction of relative (sweeping) movement of the recoater and the working surface. The relative sweeping direction can be obtained by moving the working surface with respect to the recoater, and/or vice versa. The heap of build material may be a pre-prepared pile supplied by the discharge port which is connected to a build material source, such as for example a container holding build material or a hopper. During application of the layer of build material, the gap between the lower surface of the flattening member and the top of the working surface defines the layer of build material. Advantageously, in this way, no precision is required to the ejection of powder from the build material source (e.g. hopper).

By means of the discharge port a quantity of build material is provided in front of the flattening member. This quantity forms a heap of build material in front of the flattening member (upstream in a relative direction of the movement of the recoater and working surface). A detached or freestanding heap of build material may be formed ahead of the flattening member. The formed heap of build material may be completely detached from the build material discharged by the discharge port. It will be appreciated that an attached (non-freestanding) heap of build material may also be employed.

The shutter may keep the heap of build material ahead of the flattening member in the direction of relative movement substantially intact. In this way, it may no longer be required to build up the heap of build material prior to starting a recoater stroke in which a layer of build material is formed on the working surface.

The shutter may include a shutter blade for closing the adjacent area ahead of the lower surface of the flattening member in the closed position. The shutter blade of the shutter may have various shapes and dimensions. In an example, the shutter blade forms a thin rectangular plate. Other shapes may also be used. It will be appreciated that other closing arrangements may also be used, such a telescopic plate, a diaphragm closure, a rotating closure, a pivotal closure, etc.

The shutter may include a shutter blade which is, in use, configured to be shoved through the formed heap of build material when moving to the closed position, in order to hold a substantial portion of the heap of build material above the shutter blade. In this way, the heap of build material may remain substantially intact for later use by the recoater.

Optionally, the shutter blade of the shutter is smaller than 2 mm, more preferably smaller than 1 mm. In this way, the heap of build material may be better captured by the shutter.

Advantageously, according to the invention, less powder dust may be generated since it is no longer necessary to drop surplus powder in a receptacle. A selective deposition of powder material on a working surface can be obtained. This is very advantageous in a system in which the recoater is at a fixed position and a plurality of moving units with to be recoater working surfaces are moved along said recoater.

Optionally, the recoater includes a first chamber and a second chamber different than the first chamber, the first chamber holding a quantity of build material, wherein a discharge port is arranged between the first chamber and the second chamber, the discharge port being configured to provide build material to the second chamber such as to form a heap of build material ahead of the flattening member (in the relative direction of movement of the recoater and working surface). The first chamber may for instance be a reservoir containing build material, such as a hopper. A clearance or gap may be provided between the flattening member and the working surface, such that during relative movement of the recoater across the working surface, a layer of build material is formed on the working surface. Build material from the heap of build material is guided through the clearance/gap to form a smooth layer of build material (e.g. powder bed).

Optionally, the first chamber is detachable and/or replaceable.

The flattening member may be a recoater blade. However other types of flattening members may also be used, such as a roller.

A layer of build material can be formed over a previously formed layer by means of the recoater, wherein the recoater is swept over the previously formed layer with a value of a gap (clearance) between a lower surface of the recoater and the working surface of the build material. The gap can be different than zero for defining the thickness of the applied layer.

The recoater may provide a detached heap of powder. Advantageously, it can be prevented that the density of the applied layer is gradually changed along the direction of a recoater stroke. Thus, an object can be formed having more consistent material properties.

Optionally, the opening of the discharge port can be adjusted. The width of the outflow opening of the discharge port may be adjusted. In this way, the formed heap of build material can be influenced such that the pressure on the build material can be changed and/or controlled depending on the type of build material (e.g. powder) used.

Optionally, in the closed position the shutter is configured to carry the heap of build material.

The heap of build material may be allowed to rest on the shutter. The heap of build material can be carried along with the recoater and is ready for use at a later time step. The remainder of the heap of build material after a recoating stroke is not spread on the surface, such that waste of build material can be reduced.

Optionally, in the closed position a lower surface of the shutter is substantially aligned with respect to the lower surface of the flattening member.

Optionally, the shutter blade of the shutter is moved against the flattening member such that their lower surfaces are substantially aligned forming a smooth surface. In this way, it can be prevented that the shutter blade is pushed underneath the flattening member which could result in undesirable disruption of the formed layer of build material (e.g. powder bed). The bottom surface of the shutter blade may be at a same height as the bottom surface of the flattening member. The shutter blade may rest against a side portion of the flattening member in the closed position. In an example, the shutter blade is configured to rest against a bottom edge of the flattening member, the flattening member for instance being a recoater blade. It will be appreciated that other types of flattening members may be used, such as rollers.

The lower surface of the flattening member can be flat. The shutter blade of the shutter may for instance be parallel to the lower surface of the flattening member.

Optionally, the shutter is slidingly displaceable between the opened position and the closed position.

The recoater may include a sliding arrangement enabling sliding displacement between the opened position and the closed position, and vice versa. The sliding arrangement may include a biasing element configured to bias the shutter into one of the opened position and the closed position. The biasing element may for instance be a spring. Other biasing elements may also be employed, such as for example an elastic member.

Optionally, the shutter is switchable between the opened position and closed position, and/or vice versa, at least during relative movement between the recoater and the surface.

The shutter may be switchable during relative movement of the recoater, for example when the working surface is moved with respect to the recoater and/or when the recoater is moved with respect to the working surface. Additionally or alternatively, the recoater may be configured to be switchable during when stationary, i.e. no relative movement between the working surface and the recoater.

Optionally, the shutter is switchable between the opened position and closed positon, and/or vice versa, with a speed larger or equal to a recoating speed. It may be desired to have a sufficiently fast switching of the shutter between the opened position and the closed position. The shutter may for instance be switchable between the opened position and closed position, and vice versa, by means of a shutter blade. The recoating speed at which the recoater and the working surface are relatively moved with respect to each other can significantly influence the cut-off portion of the layer of build material. The cut-off portion can be a transition region wherein a region of the applied of layer of build material transitions to a region free of build material. It may be preferred to have a smooth and/or short cut-off portion, for instance along a straight line. An improved cut-off portion may be obtained by adapting the speed of the shutter (e.g. shutter blade) to a speed larger or equal to the recoating speed.

When the shutter is moved from the closed position to the opened position, the speed of the shutter blade of the shutter may be sufficiently fast in order to avoid that build material is carried along with it. The shutter blade may for instance have a sufficiently large speed in order to avoid build material of the heap of build material being dragged with it as a result of the movement between the build material and the shutter blade. In an example, the sliding speed of the shutter blade is larger or equal to the recoating speed during movement.

Optionally, the shutter is switchable between the opened position and closed position, and/or vice versa, with a speed substantially equal to a recoating speed.

A further improvement of the cut-off portion can be obtained by choosing the speed of the shutter (e.g. shutter blade) substantially equal to the recoating speed.

In this way, a shorter transition region may be obtained between a layered region and a non-layered region, cf. cut-off portion. This can have the advantage that the build unit can have smaller dimensions. The build unit may for instance be kept relatively short, so that less space is needed and thus a more efficient additive manufacturing system can be obtained.

When the shutter blade of the shutter is moved at substantially the recoating speed (i.e. relative speed at which the recoater and the working surface are moved with respect to each other), the layer of build material applied on the working surface can be cut-off with a substantially straight line when the shutter is moved from the opened position to the closed position. In this way, it can be ensured that the shutter blade is substantially stationary relative to the working surface (moving at the same relative speed) when the shutter is changing from the opened position to the closed position and/or vice versa. Since the shutter blade seemingly stands still relative to the working surface, the layer of build material can be cut-off at an improved substantially straight line on the working surface.

Optionally, the recoater further includes a scraper having a raised edge, wherein the raised edge is arranged to scrape off build material resting on the shutter during retraction of the shutter from the closed position to the opened position.

In the closed position, the heap of build material is resting on the shutter blade. When subsequently the shutter blade is moved from the closed position to the opened position, with the heap of material resting on it, material can be carried along with the shutter blade. By means of the scraper, it can be prevented that remaining build material is carried too far away with the shutter blade. For example, if build material (e.g. powder) sticks on the shutter, it can be scraped off. Build material being scraped off, may fall off through the adjacent area towards the working surface.

The scraper may be an upright wall arranged above the shutter blade, wherein the shutter blade is configured to slide along a bottom side of the upright wall for enabling scraping of remaining residual build material thereon. It will be appreciated that other types of scrapers may also be used instead of an upright wall. For instance, sticking of build material of the shutter blade of the shutter may be reduced using vibrations.

Optionally, the shutter is at least partially made out of a low frictional material. In an example, a smoothed material is used. For example, a copper shutter blade may be employed. Additionally or alternatively, at least a portion of the shutter may be hydrophobic.

Optionally, the shutter includes a flexible film which is held by one or more ribs.

Optionally, the shutter blade is made out of a stretchable flexible material. The shutter blade may be stretched like a cloth by means of one or more ribs.

Optionally, the shutter blade is not self-supporting. The shutter blade may be obtained by stretching a thin flexible film by a frame including one or more ribs. Advantageously, in this way, the obtained shutter blade may be made very thin while having sufficiently strength for substantially maintaining its shape with the captured heap of build material resting thereon.

Optionally, the shutter blade has a thinned portion around a location where the heap of material is supported. One or more ribs provide support for the thinned portion. The shutter blade may be moved between the opened position and the closed position by means of guiding means.

The flattening member of the recoater can be arranged to provide a substantially flat layer of build material. The recoater can be translated across the working surface, wherein the flattening member is configured to wipe build material from the heap of build material over the working surface (e.g. on a build platform) to form (successive) build material layers.

It will be appreciated that the build material can be dispensed on a supporting platform which provides a working surface. The successive layers of build material may be applied layer-per-layer on top of each other on the supporting platform. A layer of build material may thus provide a working surface of the next layer of build material to be applied. The working surface and the recoater may be relatively displaceable with respect to each other in at least two dimensions, comprising a spreading direction for applying a layer of build material across at least a portion of the working surface, and a height direction defining the distance between the lower surface of the recoater (e.g. lower surface of the flattening member) and the working surface, i.e. the gap.

Optionally, the recoater includes and/or is associated with a controller. The controller can be configured to control the recoater to spread build material into a layer on top of a working space, e.g. previously applied layer containing solidified build material. The controller can be configured to control other processes of an additive manufacturing system.

The build material may be a flowable material (e.g. powder, liquid, etc.) which is solidifiable upon being treated by solidification means (e.g. light source). The build material can be capable of selective transformation upon exposure to a prescribed stimulation. An energy source may be used to selectively bring the layer of build material at a temperature above a certain temperature for obtaining localized solidification.

Optionally, the recoater further includes a vibrator configured to vibrate one or more walls such as to improve flow of build material towards the discharge port.

Optionally, the recoater includes one or more sensors for detecting a level of build material. Optionally, the recoater includes at least one sensor for detecting a level of the heap of build material upstream the flattening member.

Optionally, the discharge port includes a gear pump or the like for controlling the flow of build material. It will be appreciated that other flow controlling means or valves can also be used.

Optionally, the recoater further includes an environment barrier arranged for preventing gasses, such as oxygen, from reaching the heap of build material (i.e. the chamber in which the heap of build material is formed). For instance, in selective laser sintering at high temperatures, it may not be desirable for oxygen to be added, since oxygen may result in detrimental effects such as oxidation, staining, etc. By means of the environment barrier, it may be allowed to work under a controlled atmosphere, for instance a nitrogen atmosphere, or an argon atmosphere.

Optionally, the recoating is unidirection. It may thus be desired that the pressure on the powder bed is as constant as possible such as to avoid variations in density of the powder bed. This can be achieved by employing adjustment means for controlling the supply of build material for forming the heap of build material upstream the flattening member.

According to an aspect, the invention relates to a method for applying a layer of build material capable of solidification on a working surface by means of a recoater, wherein the recoater comprises a discharge port and a flattening member, the method including the steps of: discharging, by means of the discharge port, build material to form a heap of build material ahead of the flattening member, spreading, by means of the flattening member, material from the heap of build material along the working surface in order to form the layer of build material on top of the working surface through a gap formed between a lower surface of the flattening member and the working surface by relative movement of the flattening member and the working surface, wherein the recoater is provided with a shutter distanced from the discharge port, wherein the shutter is movable between a closed position in which build material is not dispensed onto the working surface, and an opened position in which build material is dispensed on the working surface, wherein the shutter close an adjacent area ahead of the lower surface of the flattening member in the closed position.

The medium can be a powder. A powder may exhibit sufficient friction to form a heap of powder material upstream of the recoater blade. As a result, a heap of powder can be obtained with a substantially constant volume or weight during the recoating action. In this way, a more uniform deposition of powder material can be obtained.

Advantageously, a build material collector, e.g. build material waste bin, may no longer be required. Such a surplus build material chamber may be disposed outside the fabrication chamber of an additive manufacturing system for receiving surplus of the powder having not been filled in the fabrication chamber. Moreover, re-supplying means configured for re-supplying the collected waste build material to a build material supply may also no longer be required.

The build material may be supplied forward from the flattening member in a relative running direction of the recoater with respect to the working surface.

The speed of closing the shutter blade can be set according to the recoater speed. This allows the shutter blade speed (dynamic) to be changed depending on the recoater speed, i.e. the relative speed between the recoater and the working surface on which powder is applied.

The shutter blade can be closed at the same speed and direction as the speed and direction of movement of the recoater. Hence, the speed of the shutter blade during switching from the opened position to the closed position can be chosen based on the relative speed between the shutter blade and the working surface. In this way, the shutter blade may substantially stay at a certain position with respect to the working surface during relative movement between the recoater and the working surface. In this way, an improved powder deposition cut-off line can be obtained. Optionally, also for opening, the speed of the shutter blade during switching from the opened position to the closed position can be chosen based on the relative speed between the shutter blade and the working surface.

According to an aspect, the invention relates to an additive manufacturing system including the recoater according to the invention.

The ability to have less waste build material, significantly drives down the involved costs. A cost-effective additive manufacturing system can be obtained as a result of savings associated with reduction in material waste. Moreover, a simpler design can be obtained requiring less manual labor.

According to an aspect, the invention relates to an additive manufacturing system including at least a conveyer, a plurality of build units moveable along the conveyor, and a recoater according to any one of the preceding claims 1-9, wherein one or more of the plurality of build units are arranged to subsequently pass along the recoater by means of the conveyor.

Advantageously, the recoater may enable industrial 3D printers where the different additive manufacturing processes are made parallel using several build units. The 3D additive manufacturing can therefore become more economically attractive as a production technology. The recoater may be used for additive manufacturing processes (e.g. using moving build units) on an industrial scale, wherein the amount of wasted build material is reduced using the recoater. Advantageously, the recoater may provide a closing mechanism which can effectively stop the flow of build material between different build units. Furthermore, a higher production speed of the 3D printer may be obtained employing the recoater.

The recoater may be mounted at a fixed position. The system can be a carousel selective laser sintering system with a non-moving recoater compartment. Within the recoater compartment, the recoater may be mounted in a fixed position. A plurality of build units may be provided arranged for moving and passing at least the recoater compartment. By means of the recoater, between build units, the flow of powder from the recoater can be stopped. In this way, surplus powder at the end of a recoating stroke can not be dumped in a waste pocket.

Optionally, the additive manufacturing system further includes a solidification chamber, and at least one of a preheating and/or postheating chamber, wherein the plurality of build units are movable to said chambers by means of the conveyor.

According to an aspect, the invention relates to a method of layerwise forming an object from a medium capable of solidification, whereby the object is built up layer per layer by repeatedly providing a layer of the medium on a support and/or an already formed part of the object and by subsequently solidifying one or more predetermined areas of the layer of the medium according to a specific pattern before a successive layer is formed in a same manner, wherein the successive layers of medium are applied using a recoater according to the invention.

The recoater may be employed in various additive manufacturing process wherein a physical object is produced through layer-by-layer solidification of a build material, such as a polymer powder, a metal powder, etc. The additive manufacturing process may be for example a selective laser melting process, a selective laser sintering process, a stereolithography process, etc. Solidification may be obtained using a high energy beam, such as a laser beam.

An additive manufacturing process can be used for building a three-dimensional object using a layer-by-layer approach. The additive manufacturing process may involve the following steps in general: (i) a layer of build material is spread over a working surface such as a build platform or plate, optionally be means of the recoater; (ii) solidification means are used for solidifying (e.g. fusing by means of a laser) the first layer or first cross-section of the object; (iii) a new layer of build material is spread across the previous layer using the recoater; (iv) further layers or cross sections are solidified and added; and (v) the process is repeated a plurality of times until at least a portion of the entire object is created. Loose, unfused build material (e.g. powder) may remain in position during manufacturing of the object, but can be removed during post processing. The recoater can be arranged to selectively apply a layer of build material.

According to an aspect, the invention relates to a method for making tangible products by layerwise manufacturing comprising the steps of: depositing in a deposition area, by using a recoater, a layer of construction material onto a first building platform for building a first layered product; conveying, by using a conveyor, the first building platform away from the deposition area; removing the first layered product from the first building platform; adjusting the distance between the recoater and the first building platform in a direction that is parallel to the building direction; depositing construction material onto said first building platform to obtain a second layered product after the first layered product has been removed; wherein adjusting is realized by moving the first building platform relative to the conveyor and in that the conveyor moves the first building platform past the recoater repeatedly to obtain the first layered product, and wherein the method further comprises the step of depositing in a deposition area, by using a recoater, a layer of construction material onto a second building platform for building a third layered product before the first layered product has been removed, wherein deposition is carried out using a recoater according to the invention as the recoater.

An advantage of moving the building platform relative to the conveyor in order to adjust the distance between the recoater and the building platform is that the recoater need not to be moved and therefore can be placed at a fixed position. Keeping the recoater at a fixed position has the effect that there is no need for stopping the deposition process during adjustment of the distance between the device and a platform onto which material has to be deposited. As a consequence there is more time available for depositing material and therefore the device can be used more efficiently.

An advantage of moving the building platform so as to pass the recoater repeatedly is that subsequent layers of the same material can be deposited with the same recoater. Passing a recoater repeatedly has the effect that the number of such devices for making tangible products can be limited compared to a method wherein each layer is deposited by a separate deposition device. The use of only one or a limited number of deposition devices makes the method more costs efficient than a method in which a building platform passes a deposition device only once.

An advantage of depositing construction material onto a second building platform while the first layered product is still being constructed is that multiple products are made quasi simultaneously. The effect of this quasi simultaneous production is that more products can be made in a certain time span. Consequently, a more efficient production method is obtained.

Advantageously, a production line for additive manufacturing of tangible products can be provided allowing rapid manufacturing of mutually different products.

According to an aspect, the invention relates to a production line for layerwise manufacturing of tangible products comprising: a first building platform for carrying a tangible product; the recoater according to the invention for providing a layer of construction material onto the first building platform; a conveyor for conveying the first building platform in a conveying plane; height adjustment means for adjusting the distance between the recoater and the first building platform; wherein the conveyor is a conveyor for conveying the first building platform towards the recoater and away from the recoater repeatedly, and the height adjustment means are configured for displacing the first building platform relative to the conveyor in a direction perpendicular to the conveying plane, and wherein the production line further comprises a second building platform for receiving said material, which second building platform is conveyable by said conveyor and which second building platform is displaceable relative to the conveyor independent from the first building platform, wherein the recoater according to the current invention acts as the recoater.

An advantage of a conveyor for conveying the platform towards the recoater and away from the recoater repeatedly, is that each platform can pass a single recoater several times. The effect of passing a single recoater several times is that only a limited number of recoaters, possibly only one recoater is required for making a tangible product. A production line comprising only a limited number of recoaters will cost less than a production line in which each layer is deposited by a separate recoater.

An advantage of the height adjustment means being configured for displacing the building platform relative to the conveyor in a direction perpendicular to the conveying plane, is that the recoater may be placed at a fixed position and that the distance between the recoater and the building platform can be adjusted when the building platform is removed from the deposition area, viz. away from the recoater. The effect is that the recoater can be used to make another product during the time that the height of the building platform is being adjusted. This allows a more efficient use of the recoater during the layerwise manufacturing of tangible products.

An advantage of a second building platform for receiving the material is that a second product, that may be different from the first product, can be made simultaneously with the first product. This makes the production line more efficient.

According to an aspect, the invention relates to a use of the recoater according to the invention in an additive manufacturing process or system.

Different types of powder material can be used for recoating, such as for example polymer powders, metal powders and ceramic powders. Other powder materials are also possible, such as for example food powders and pharma powders.

According to an aspect, the invention provides for a recoater for applying a layer of build material capable of solidification on a surface, the recoater being relatively movable in at least one running direction across the surface, wherein the recoater comprises a discharge port and a flattening member, wherein the discharge port is configured to discharge build material to form a heap of build material at an opening area ahead or in front of the flattening member in the at least one running direction, wherein the discharge port and the opening area are distanced from each other, wherein the flattening member is configured to carry the heap of build material along the surface in the at least one running direction in order to spread the layer of build material on top of the surface, the recoater being configured to provide a gap between a lower surface of the flattening member and the surface during relative motion for applying the layer of build material, wherein the recoater further includes a shutter configured to be movable between a closed position in which build material is not dispensed through the opening area on the surface, and an opened position in which build material is dispensed through the opening area on the surface, wherein the shutter is configured to selectively close the opening area adjacent the lower surface of the flattening member.

It will be appreciated that any of the aspects, features and options described in view of the recoater apply equally to the method and the described additive manufacturing system. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
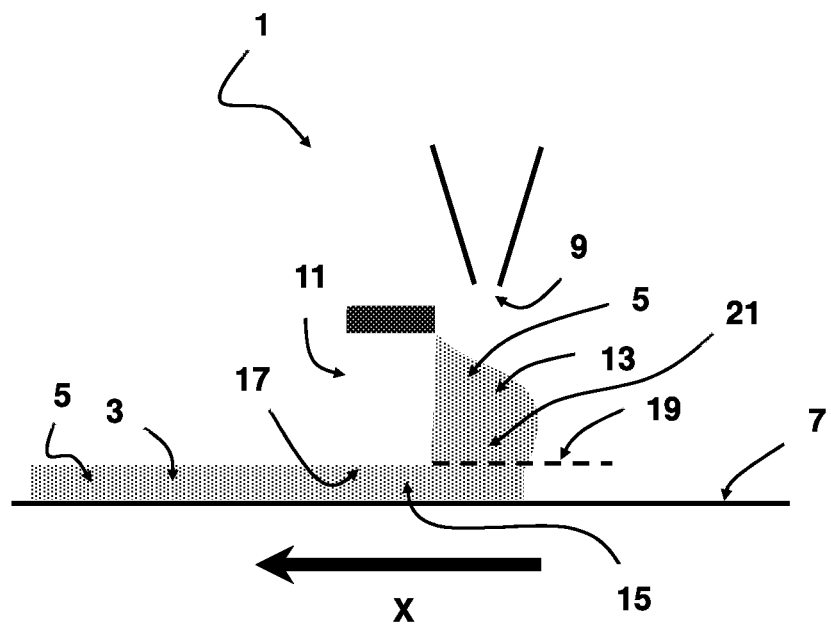
FIG. 1 shows a schematic diagram of a recoater.

FIG. 1 shows a schematic diagram of a recoater 1 for applying a layer 3 of build material 5 capable of solidification on a working surface 7. The working surface 7 may be formed by a holder of a build unit or a previously formed layer of build material 5 (e.g. powder bed). The recoater 1 comprises a discharge port 9 and a flattening member 11. The discharge port 9 is configured to discharge build material 5 to form a heap of build material 13 ahead of the flattening member 11. The flattening member 11 is configured to spread material from the heap of build material 13 along the working surface 7 in order to form the layer of build material 3 on top of the working surface 7 through a gap 15 formed between a lower surface 17 of the flattening member 11 and the working surface 7 by relative movement of the flattening member 11 and the working surface 7. In this example, the relative movement between the recoater 1 and the working surface 7 for sweeping the flattening member 11 across the working surface 7 is obtained by providing a translating movement X of the working surface 7 with respect to the recoater 1. The recoater 1 may thus remain stationary while the working surface 7 is moved. It will be appreciated that additionally or alternatively, the recoater 1 may be moved.

The recoater 1 further includes a shutter 19 distanced from the discharge port 9, wherein the shutter 19 is configured to be movable between a closed position in which build material 5 is not dispensed onto the working surface 7, and an opened position in which build material 5 is dispensed onto the working surface 7. The shutter 19 is configured to close an adjacent area 21 ahead of the lower surface 17 of the flattening member 11 in the closed position. In this way, an interface through which build material 5 is provided onto the working surface 7 can be selectively covered by means of the shutter 19.

In a closed position, the heap of build material 13 can be at least partially intercepted such that at least a remaining portion of the heap of build material 13 can rest on the shutter. Different shutter arrangements can be employed. In an example, a shutter blade is used for obtaining selective closing of the adjacent area.

Figure 2A:
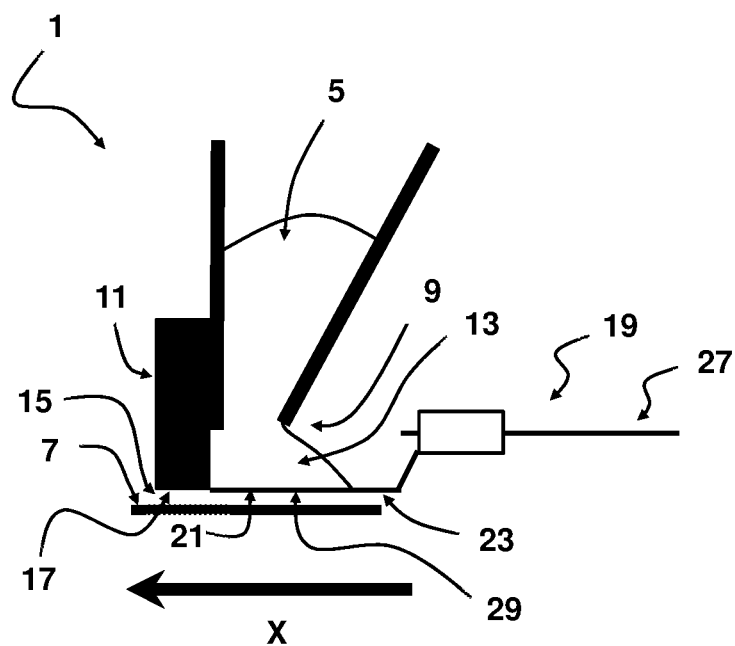
FIG. 2 shows a schematic diagram of a recoater.
Figure 2B:
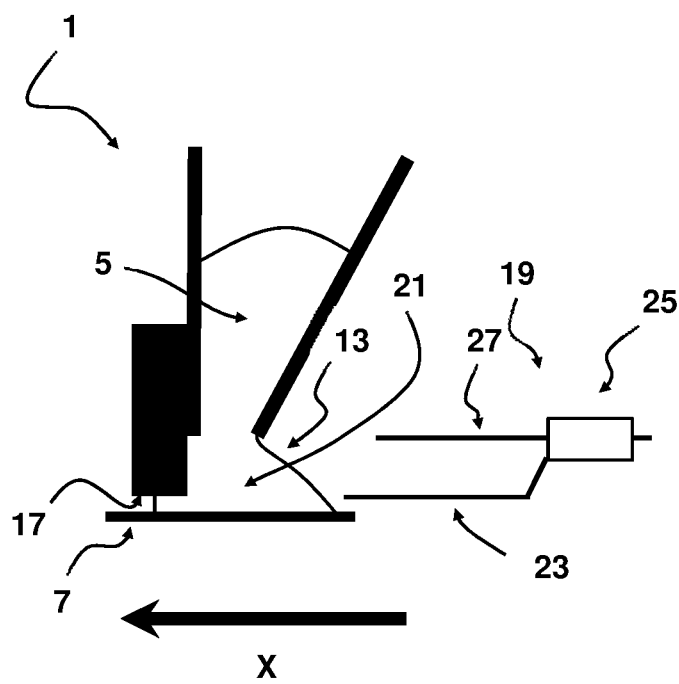

FIG. 2 shows a schematic diagram of a recoater 1. In this embodiment, the shutter 19 is slidingly displaceable between the closed position (cf. FIG. 2A) and opened position (cf. FIG. 2B). The shutter 19 includes a shutter blade 23 for selectively covering the adjacent area 21. In the closed position, the heap of build material 13 can rest on the shutter blade 23. The recoater 1 includes a sliding arrangement enabling sliding displacement between the opened position and the closed position, and vice versa. The shutter blade 23 is connected with a slider 25 which can slide along a slider line 27.

As shown in FIG. 2A, in the closed position the shutter blade 23 of the shutter 19 is configured to carry the heap of build material 13. The heap of build material 13 can be carried along with the recoater 1 for later use. In this way, it can be prevented that the remainder of the heap of build material after a recoating stroke is spread on the surface. Wasting of build material can thus be reduced since the recoater can selectively apply a layer of building material 3 onto the working surface 7. In this embodiment, the lower surface 29 of the shutter blade 23 is substantially aligned with respect to the lower surface 17 of the flattening member 11. The shutter blade 23 of the shutter 19 can be moved against the flattening member 11 such that their lower surfaces 29, 17, respectively, are substantially aligned forming a smooth flat surface. In this way, it can be prevented that the shutter blade is pushed underneath the flattening member which may result in undesirable disruption of the formed layer 3 of build material (e.g. powder bed). The bottom surface 29 of the shutter blade 23 may be at a same height as the bottom surface 17 of the flattening member 11 (with respect to the working surface 7). The shutter blade 23 may rest against a side portion of the flattening member 11 in the closed position (see FIG. 2A). In an example, the shutter blade 23 is configured to rest against a bottom edge of the flattening member 11 facing the front side of the flattening member 11. The flattening member 11 in this embodiment is a recoater blade. Other types of flattening members 11 may also be used. The flatting member 11 may have various shapes and dimensions. In an example (not shown) the flattening member 11 is a roller.

In the shown embodiment of FIG. 2, the lower surface of the flattening member 11 is flat, wherein the shutter blade 23 of the shutter 19 is parallel to the lower surface 17 of the flattening member 11.

Figure 3:
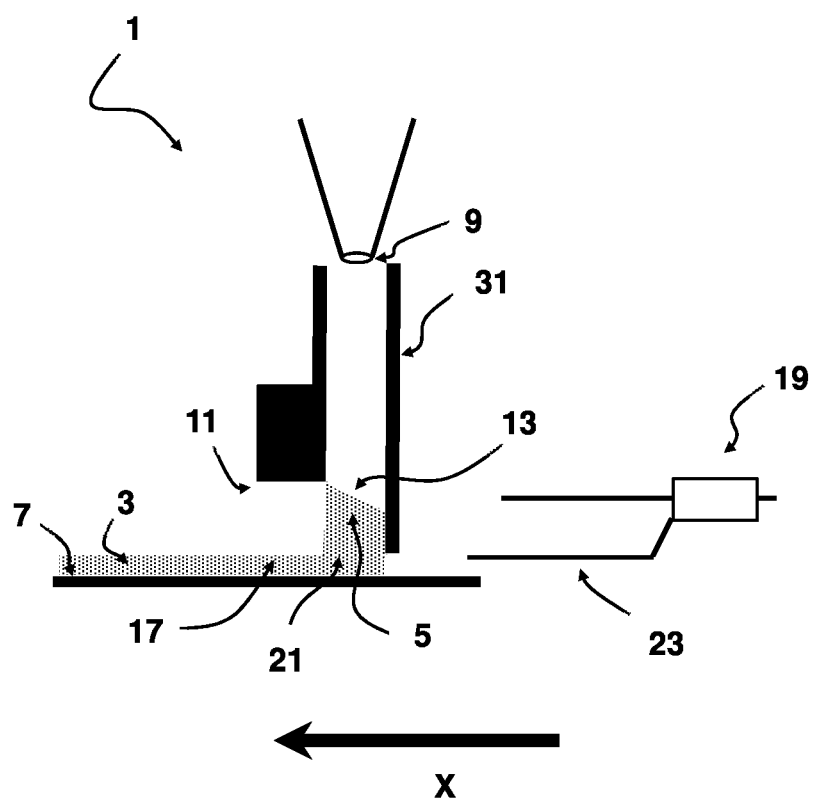
FIG. 3 shows a schematic diagram of a recoater.

FIG. 3 shows a schematic diagram of a recoater 1. The recoater 1 is configured to apply a uniform layer 3 of build material 5 onto the working surface 7. The working surface 7 may for instance be a previous applied layer of building material. The recoater 1 may be used for enabling a layer-by-layer processing in an additive manufacturing process wherein a powder is employed. The discharge port 9 is configured to provide a supply of build material 5 towards a front side of the flattening member 11, with respect to the relative direction of movement of the recoater 1. In this embodiment, the working surface 7, for example held on a build unit of an additive manufacturing system, is moved along the running direction X. The discharge port 9 can be arranged to control the supply of build material 5, for instance coming from a reservoir or hopper (not shown). A heap of build material 13 is formed below the discharge port at the front side the flattening member 11. Optionally, a sensor is used for monitoring a level of the heap of build material 13.

By means of the recoater, build material 5 can be spread across the working surface 7 for selectively forming at at least a portion of the working surface 7 the layer 3 of build material 5. Build material 5 from the heap of build material 13 is guided through the gap formed between the bottom side 17 of the flattening member 11 and an upper side of the working surface 7.

The build material 5 discharged from the discharge port 9 can be collected in a walled heap chamber 31. The walled heap chamber can be selectively closed off by means of the shutter 19. In this embodiment, the shutter includes a sliding shutter blade 23. It will be appreciated that other shutter 19 mechanisms may also be employed. In closed position of the shutter 19, the shutter blade intercepts the heap of build material 13, such that the portion of the heap of build material 13 above the shutter blade 23 can be maintained. Hence, a large portion of the initial heap of build material 13 can rest on the shutter blade 23 and be used for a subsequent coating by the recoater 1. Advantageously, the transition between layer and non-layer portions on the working surface 7 can be improved. A sudden and accurate transition can be obtained. Furthermore, for the purpose of subsequent recoating, refilling the heap chamber 31 for obtaining the heap of build material 13 may no longer be required, resulting in improved process efficiency and time savings.

The shutter blade 23 is distanced from the discharge port 9. The shutter is configured to be movable between a closed position (not shown) in which build material is not dispensed onto the working surface, and an opened position (shown) in which build material is dispensed onto the working surface. The shutter 19 is configured to close the adjacent area 21 ahead or upstream of the lower surface 17 of the flattening member 11, in the closed position. The upstream location is related to the relative motion of the recoater or the flattening member with respect to the working surface 7. In this embodiment, the working surface 7 is translated with respect to the recoater 1 in the running direction X. However, it may also be additionally or alternatively possible that the recoater 1 is moved with respect to the working surface 7.

Figure 4:
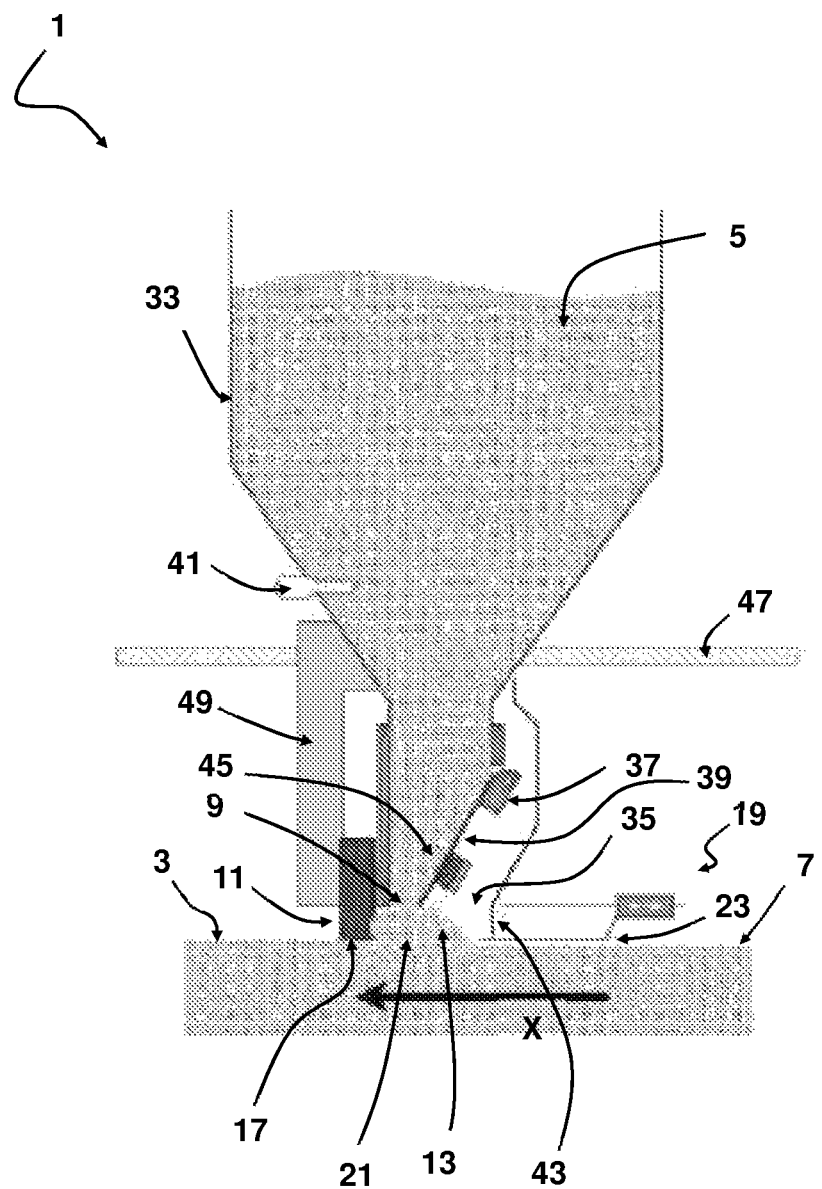
FIG. 4 shows a schematic diagram of a recoater.

FIG. 4 shows a schematic diagram of a recoater 1. The recoater is configured to apply a layer 3 of build material 5 capable of solidification on a working surface 7. The recoater 1 comprises a discharge port 9 and a flattening member 11. The discharge port 9 is configured to discharge build material 5 in order to form a resulting heap of build material 13 ahead of the flattening member 11, i.e. upstream the flattening member with respect to the relative movement of the recoater 1 and the working surface 7. The flattening member 11 may be configured to spread build material 5 from the heap of build material 13 along the working surface 7 in order to form the layer of build material 3 on top of the working surface 7 through a gap 15 formed between a lower surface 17 of the flattening member 11 and the working surface 7 by means of relative movement of the flattening member 11 and the working surface 7. The recoater 1 further includes a shutter 19 distanced from the discharge port 9. In this embodiment, the shutter includes a shutter blade 23 movable arranged by means of a sliding arrangement. The shutter 19 is configured to be movable between a closed position in which build material 5 is not dispensed onto the working surface 7, and an opened position in which build material 5 is dispensed onto the working surface 7. The shutter 19 is configured to close an adjacent area 21 ahead of the lower surface 17 of the flattening member 11, in the closed position.

The build material 5 can be discharged by means of the discharge port 9 ahead (upstream) of the flattening member 11 such that it can pile up to form the heap of build material 13. In this embodiment, the build material is made out of powder. The flattening member 11 traverses relative to the working surface 7, which is formed by a powder bed, such that the build material 5 is distributed as a uniform layer over the working surface 7 (powder bed).

The recoater 1 can be employed for forming the powder layer onto the powder bed in a build chamber. The build chamber may for instance be part of a build unit of an additive manufacturing system. By depositing the heap of powder 13 adjacent to the powder bed and spreading the heap of powder with a flattening member 11 across (from one side to another side of) the powder bed the uniform powder layer can be formed. The flattening member 11 may thus act as a wiper, configured to spread upstream build material collected in the heap of build material 13.

Optionally, a laser beam can be scanned across portions of the powder layer that correspond to a cross-section of the object being constructed. The laser beam can melt or sinter the powder to form a solidified layer. After selective solidification of a layer, the powder bed can be lowered by a thickness of the newly solidified layer and a further layer of powder can be spread over the surface and solidified, as required.

The heap of build material 13 may be a detached heap. Detachment of the heap of build material 13 can be obtained by means of a distance provided between the discharge port 9 and working surface 7 on which the build material is disposed. The shutter 19 is arranged such that in the closed position, the shutter blade 23 is aligned with the lower surface 17 of the flattening member 11.

In the shown embodiment, the recoater 1 includes a first chamber 33 and a second chamber 35 different than the first chamber 33, the first chamber 33 holding a quantity of build material 5. A discharge port 9 is arranged between the first chamber 33 and the second chamber 35. The discharge port 9 is configured to provide build material 5 to the second chamber 35 such as to form a heap of build material 13 ahead of the flattening member 11 (upstream in the relative direction of movement of the recoater and working surface). In this example, the working surface 7 is moved in the running direction X. Other ways of relative translations between the recoater 1 and the working surface 7 may also be employed for obtaining the relative movement of the recoater 1 across the top of the working surface 7. The first chamber 33 may for instance be a reservoir containing build material 5, such as a hopper. A clearance or gap is provided between the flattening member 11 and the working surface 7, such that during relative movement of the recoater 1 across the working surface 7, a layer of build material 5 is formed on the working surface 7. Build material from the heap of build material 13 is guided through the clearance/gap to form a smooth layer of build material on the powder bed.

The recoater 1 further includes adjustment means 37 configured for adjusting an opening area of the discharge port 9. In this example, the adjustment means 37 are arranged to adjust an angle of a side wall 39 for adjusting the opening area of the discharge port 9. The adjustment means 37 enable a rotational movement of the side wall 39. The adjustment of the opening area of the discharge port 9 can significantly influence the formed detached heap of build material 13 in the second chamber 35.

Further, the recoater includes an optional level sensor 41 configured to determine a level of build material at the first chamber 33.

Further, the recoater 1 includes an optional scraper 43 having a raised edge. The raised edge is arranged to scrape off build material 5 resting on the shutter blade 23 during retraction of the shutter blade 23 from the closed position to the opened position.

In the closed position, the heap of build material 13 is resting on the shutter blade 23. When subsequently the shutter blade is moved from the closed position to the opened position, with the heap of material 13 resting on it, build material can be carried along with the shutter blade 23. By means of the scraper 43, it can be prevented that remaining build material is carried too far away with the shutter blade 23. When the powder remains attached to the shutter blade 23, it can be effectively scraped off such that it may fall off towards the working surface 7 through the adjacent area 21. The scraper 43 is slidingly arranged above the shutter blade 23. The shutter blade 23 is configured to slide along a bottom side of the scraper 43 for enabling scraping of remaining residual build material when the shutter blade 23 is moved from the closed position to the opened position. It will be appreciated that other types of scrapers may also be used. For instance, attachment of build material of the shutter blade 23 may be reduced using vibrations.

The side wall 39 further includes an optional vibrator 45 configured to vibrate the at least a portion of the side wall such that a more continuous flow of build material 5 towards the discharge port 9 can be obtained. In this way, the obtained heap of build material 13 may be better maintained during the recoating process.

In the exemplary embodiment, the recoater 1 further includes an optional environment barrier 47. The environment barrier 47 may be arranged for preventing gasses, such as oxygen from entering the second chamber 39 from the first chamber 33. The build unit in which the recoater 1 is employed may for instance operate under elevated temperature or a desired atmosphere. The environment barrier 47 may prevent contamination of the environment within the build unit in which the recoater 1 is operating. The recoater 1 further includes an optional frame 49 arranged holding various features of the recoater 1.

The recoater 1 according to the embodiment of FIG. 4 may be used for achieving automatic feeding. The recoater 1 may include a combined first chamber (hopper) with an automatic build material (e.g. powder) feeder. The recoater 1 can be highly adjustable by means of adjustment means for controlling the flow of build material towards the second chamber 35. A substantially constant density in the powder bed can be obtained by means of the adjustment means. Furthermore, a large range of layer thicknesses can be achieved using the recoater 1.

Alternatively, instead of a sliding shutter blade, a rotating shutter blade can be arranged, wherein the shutter blade is rotatably switchable between the opened position and closed position, and vice versa. In the closed position, the heap of medium/powder can rest on the shutter blade. It is also envisaged that a pivotally switchable shutter blade can be arranged. Other shutter movement mechanisms can also be used, such as for example diaphragm shutters. Many variants are possible.

Figure 5:
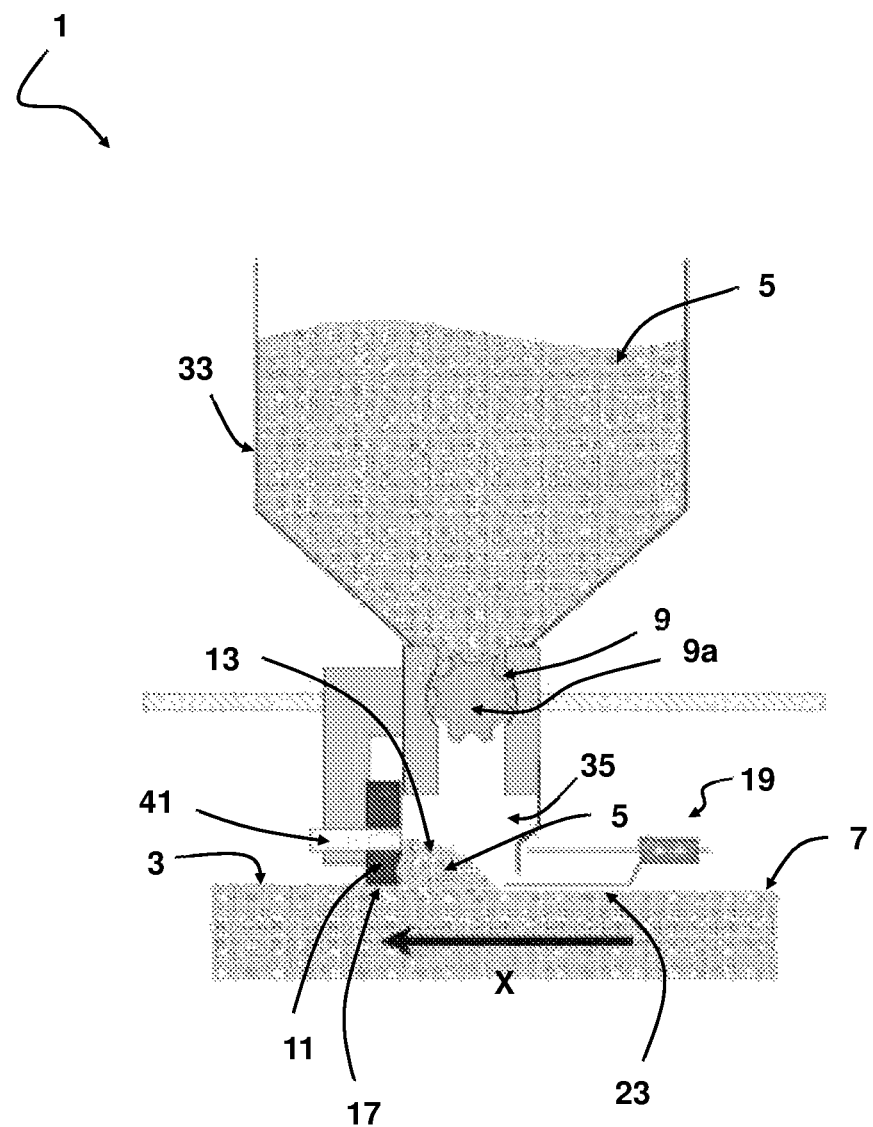
FIG. 5 shows a schematic diagram of a recoater.

FIG. 5 shows a schematic diagram of a recoater 1. Similar to the embodiment of FIG. 4, the recoater 1 includes a first chamber 33 and a second chamber 35, with a discharge port 9 therebetween. The discharge port allows a controlled supply of build material 5 towards the second chamber 35. The discharge port may provide a periodic supply of build material 5 by rotation of gear 9*a*. Other types of discharge ports 9 may also be used. For instance a gear pump with two gears may be used. The build material is disposed upstream of the flattening member 11 such as to form a heap of build material 13. In this example, an optional sensor 41 is arranged in the flattening member 11 for measuring a level of the heap of build material 13. It will be appreciated that level sensor 41 may be positioned differently. Furthermore, a different number of sensors may be used. It may also be possible to employ different kind of sensors for indicating the presence of an adequate heap of build material 13.

A detached heap of build material 13 is obtained which is spread over the working surface 7. In this example, the build material is a powder, and the layer of build material 5 is disposed on a powder bed. In this example, the working surface 7 is moved in the running direction X while the recoater 1 remains stationary. Additionally or alternatively, the recoater 1 may be moved for obtaining the relative movement for applying the layer of build material 3 onto the working surface 7.

The recoater 1 includes a shutter 19 distanced from the discharge port 9. The shutter 19 is configured to be movable between a closed position in which build material is not dispensed onto the working surface 7, and an opened position in which build material is dispensed onto the working surface 7. The shutter is configured to close an adjacent area 21 ahead/upstream of the lower surface 17 of the flattening member 11, in the closed position.

A larger hopper may result in a larger pressure at the formed heap of build material if the build material within the hopper is directly guided to the discharge port 9. However, in this exemplary embodiment, the discharge port controls the amount of build material supplied to the second chamber 35 for forming the heap of build material 13. In this way, the influence of the weight of the build material within the hopper on the formed heap of build material 13 can be reduced and/or eliminated. Therefore, different pressures and densities in the formed layers of build material (e.g. powder bed), which could result in different local mechanical properties of the created object, can be prevented. In this example, the first chamber (hopper) may be refilled or replaced easily. It may be even replaced during recoating. The first chamber may be detachable.

Advantageously, the recoater 1 in the shown embodiment of FIG. 5 may achieve a direct dosing. The first chamber 33 (hopper) may be detachable with a (fine) dosing mechanism. The first chamber can be removed with powder inside. Further, a low level detection of the heap of powder can be achieved during recoating using the sensor 41.

Figure 6A:
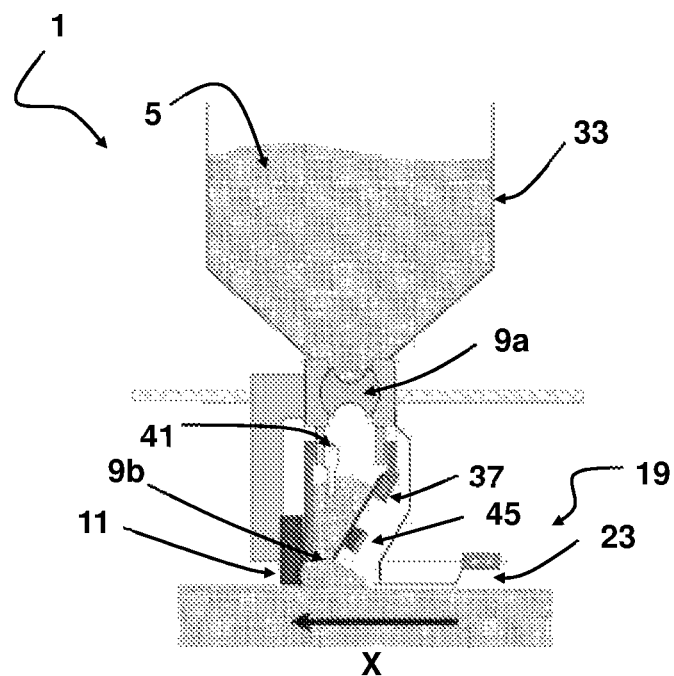
FIG. 6 shows a schematic diagram of a recoater.
Figure 6B:
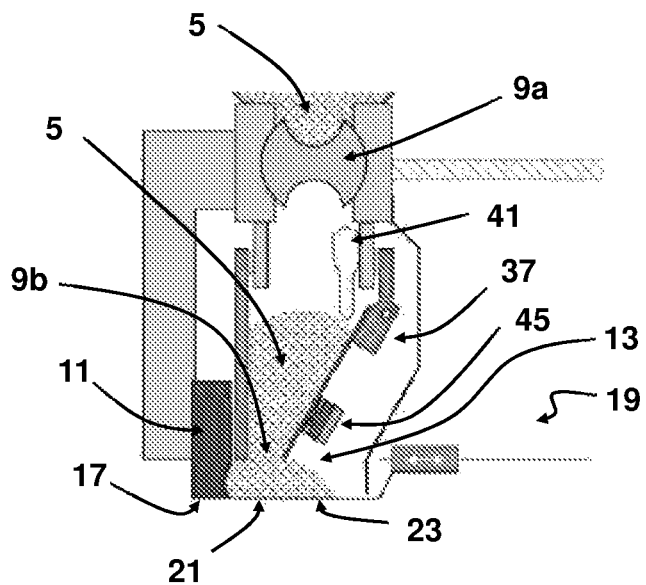

FIG. 6 shows a schematic diagram of a recoater 1. In the shown embodiment, the recoater 1 includes a first chamber 33 and a second chamber 35 different than the first chamber 33, the first chamber 33 holding a quantity of build material 5. A first discharge port 9*a* is arranged between the first chamber 33 and the second chamber 35, the first discharge port 9*a* being configured to provide build material 5 to the second chamber 35. Within the second chamber 35, a second discharge port 9*b* is arranged. The second discharge port 9*b* is similar to the discharge port arranged in the embodiment of FIG. 4. The second discharge port 9*b* is configured to form a heap of build material 13 ahead of the flattening member 11 (upstream in the relative direction of movement of the recoater and working surface).

In this example, the working surface 7 is moved in the running direction X. Other ways of relative translations between the recoater 1 and the working surface 7 may also be employed for obtaining the relative movement of the recoater 1 across the top of the working surface 7.

The shutter 19 can be translated into the opened position (FIG. 6*a*) and in the closed position (FIG. 6*b*), by means of a sliding mechanism. A detached (freestanding) heap of build material 13 can be obtained by means of the recoater 1. The heap of build material 13 can remain substantially intact when the shutter 19 is switched to the closed position. The heap can then be readily used in a later phase, for example in a subsequent recoating stroke, when the shutter 19 is witched from the closed position to an opened position.

The recoater 1 shown in FIG. 6 may achieve a highly adjustable recoating. This embodiment may for instance be suitable for providing a constant density in the powder bed. The first chamber 33 (hopper) can be removed with powder therein. Furthermore, a large range of layer thicknesses may be achieved using the recoater 1.

The recoater 1 may provide automatic feeding. The first chamber 33 (primary hopper) may be detachable with respect to the dosing mechanism of the recoater 1 (cf. second chamber 35). The second chamber 35 may be level controlled. The recoater 1 may further be used for a closed loop dosing to the second chamber 35. Advantageously, the recoating process may be independent from the level of powder in the first chamber 33. A relatively coarse dosing may be achieved if desired.

Figure 7:
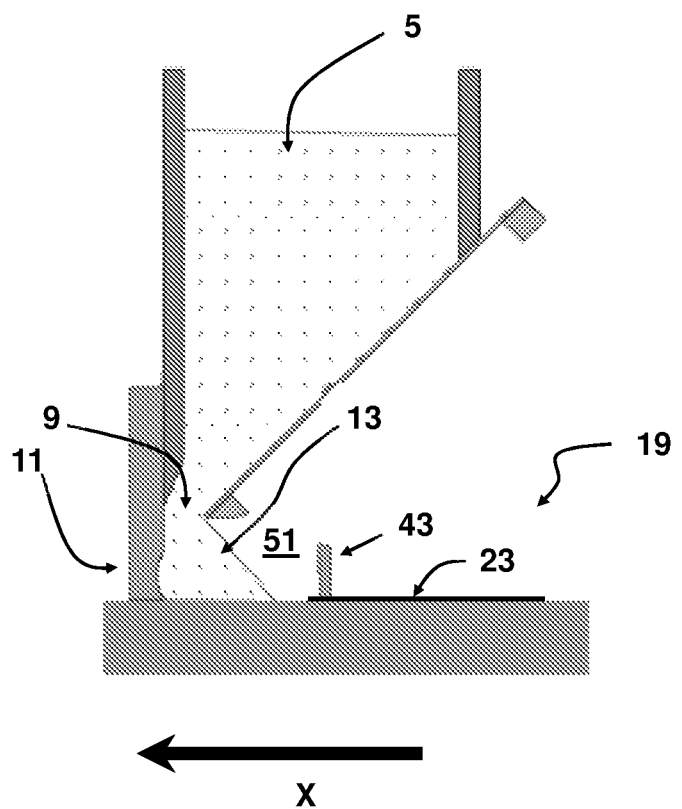
FIG. 7 shows a schematic diagram of a recoater.

FIG. 7 shows a schematic diagram of a recoater 1. An open area 51 is formed below the discharge port 9 such that a detached or freestanding heap of build material 13 can be obtained upstream the flattening member 11. By means of the resulting detached heap of build material 13, a more uniform density distribution may be obtained along the disposed layer of build material.

Optionally, the shutter blade is flexible. A flexible shutter blade can for example provide better recoating when metal powders are used.

Figure 8:
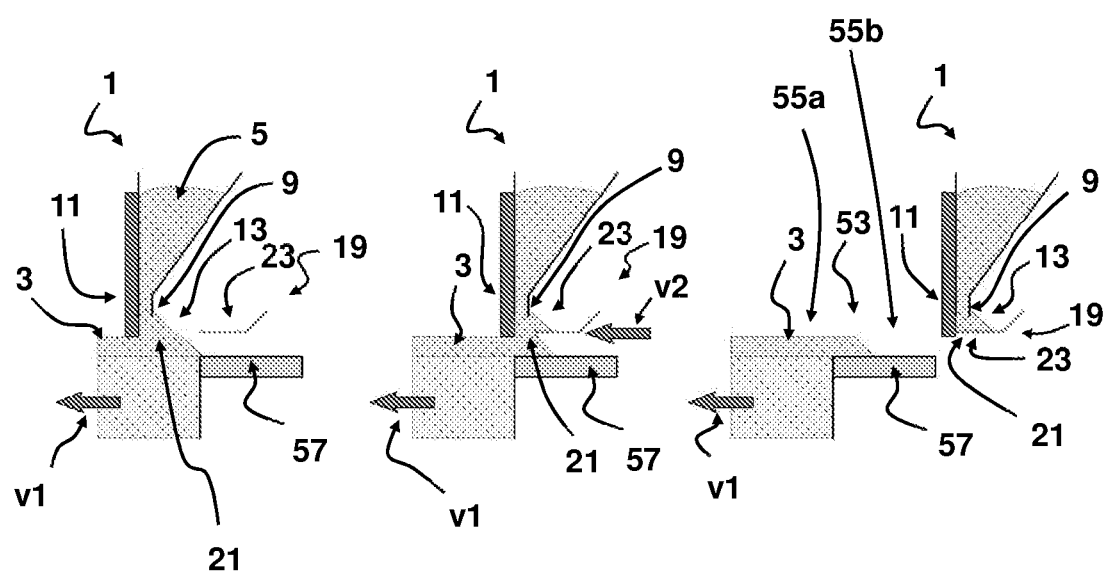
FIG. 8 shows a schematic diagram of a recoater.

FIG. 8 shows a schematic diagram of a recoater 1 at different time steps when the shutter 19 is switched from the opened position (step a) to the closed position (step c). Also an intermediate time step is shown (step b) between the opened positon (step a) and the closed position (step c) of the shutter 19. In this example the shutter 19 includes a shutter blade 23. Other shutter types may also be used, such as for example a diaphragm.

The shutter may be switchable between the opened position and closed positon, and/or vice versa, with a speed v2 larger or equal to a recoating speed v1. In this way, a sufficiently fast switching of the shutter between the opened position and the closed position can be obtained resulting in a short cut-off portion 53 of the layer of build material 3.

In an advantageous embodiment, the shutter is switchable between the opened position and closed position, and/or vice versa, with a speed substantially equal to a recoating speed.

A more stable cut-off portion 53 of the layer of build material 3 can be obtained in this way.

Advantageously, a relatively short transition region may be obtained between a layered region 55a and a non-layered region 55b. For instance, the surface 57 adjacent to the working surface 7 may not require a layer of build material 3 disposed thereon. Hence, the layer of build material may be selectively coated on the working surface 7.

In case the speed v1 at which the working surface 7 is moved with respect to the stationary recoater 1 (i.e. recoating speed) is equal to the relative speed in which the shutter blade 23 of the shutter 19 is closed, it can be ensured that the shutter blade 23 is substantially stationary relative to the working surface 7 during the closing process. (moving at the same relative speed) when the shutter is changing from the opened position to the closed position. Since the shutter blade seemingly stands still relative to the working surface, the layer of build material can be cut-off at an improved substantially straight line on the working surface.

Figure 9A:
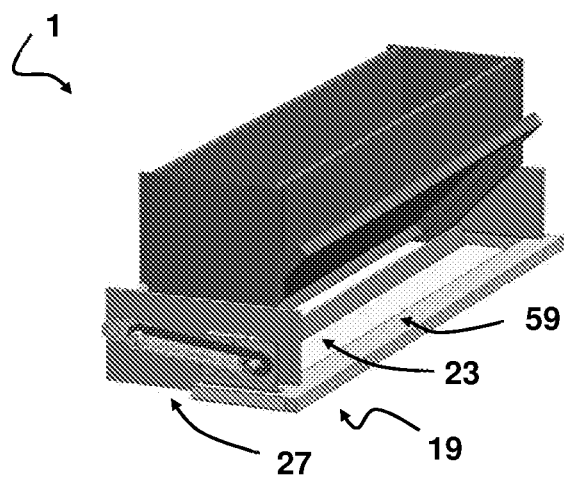
FIG. 9 shows a schematic diagram of a recoater.
Figure 9B:
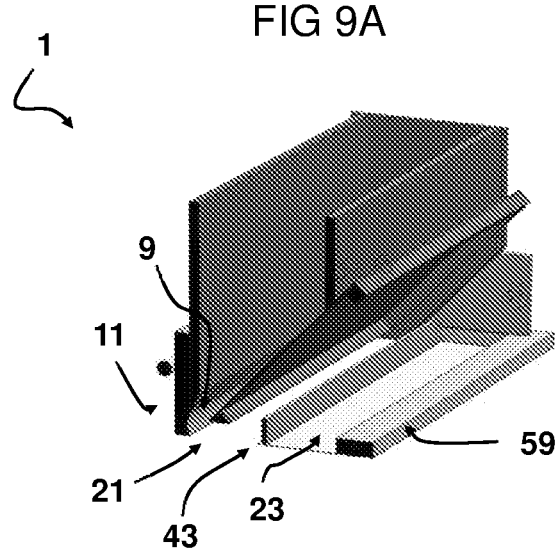
Figure 9C:
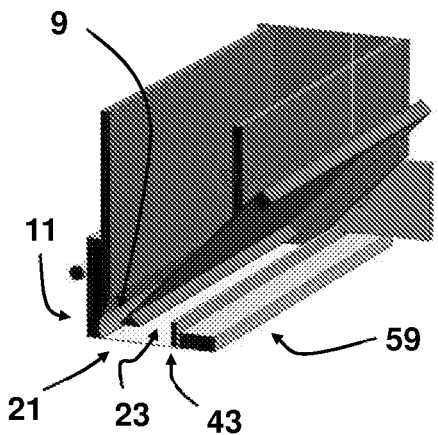

FIG. 9 shows a schematic diagram of a recoater 1. FIG. 9a shows a perspective view of the recoater 1. The shutter 19 includes a thin shutter blade 23 held by means of ribs 59. The discharge port 9 is distanced from the adjacent area 21 upstream the flattening member 11. The recoater 1 includes a sliding arrangement 27 for slidingly switching the recoater blade 23 from the opened position in which the adjacent area 21 is covered, to the closed position in which the adjacent area 21 is uncovered. FIG. 9b shows a cross-sectional perspective view of the recoater 1 with the shutter 19 in the opened position, and FIG. 9c shows a cross-section perspective view of the recoater 1 with the shutter 19 in the closed position.

Figure 10:
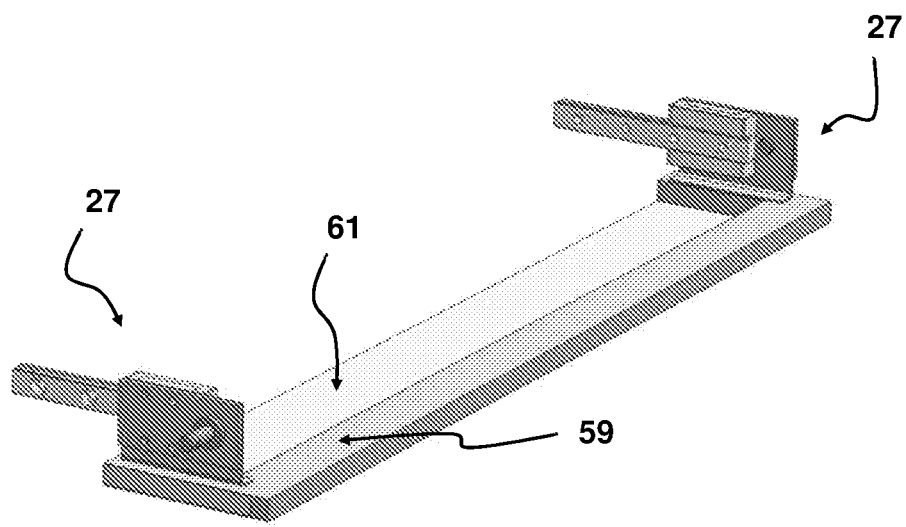
FIG. 10 shows a schematic diagram of a shutter.

FIG. 10 shows a schematic diagram of a shutter 19. In this example, the shutter 19 includes a thin flexible film 61 being stretched and held by means of ribs 59. In this way, a thinner shutter blade may be obtained advantageously. Side ribs are attached to a sliding arrangement 27 allowing the shutter to be translated between the opened position and the closed position.

Figure 11:
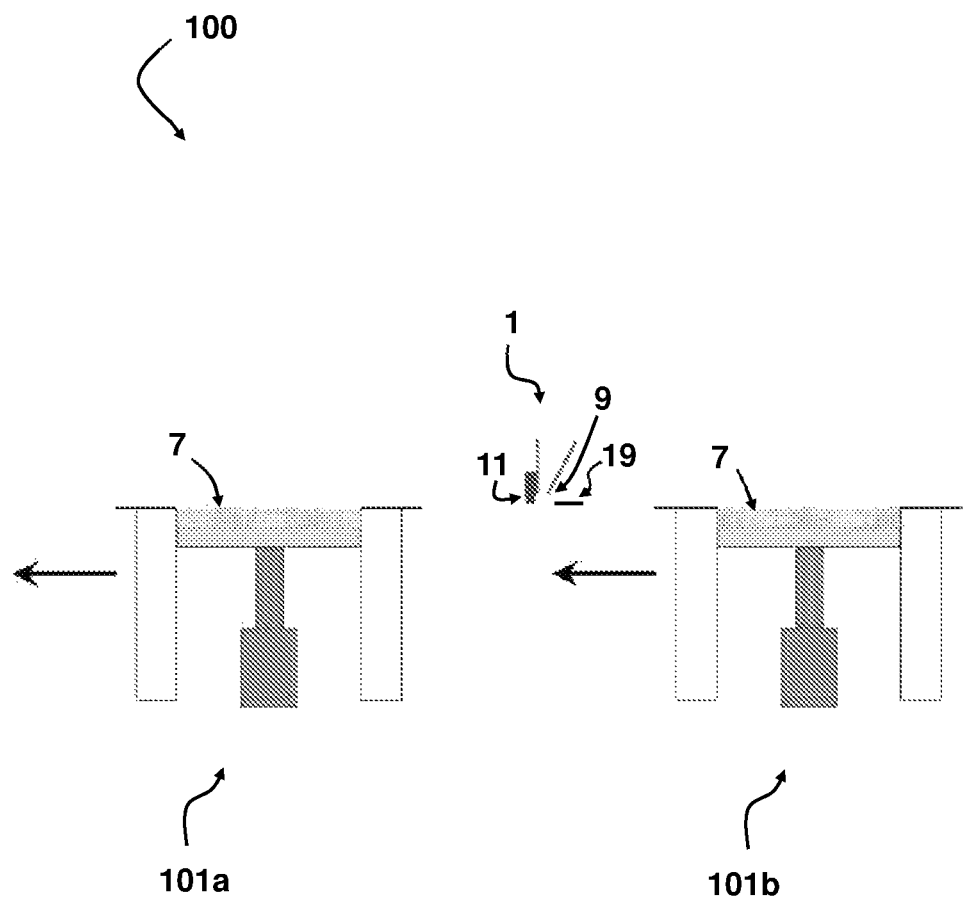
FIG. 11 shows a schematic diagram of an additive manufacturing system.

FIG. 11 shows a schematic diagram of an additive manufacturing system 100 including a conveyer (not shown), and a plurality of build units 101a, 101b moveable along the conveyor. A recoater 1 is stationary arranged within the additive manufacturing system 100. Two successive build units 101a, 101b are shown in this example, however the system 100 may include more build units. The build units 101a, 101b are arranged to subsequently pass along the recoater 1 by means of the conveyor. In this way a relative movement is obtained between the working surface 7 and the recoater 1, wherein the build units 101a, 101b are moved and the recoater is remained stationary.

The recoater includes a shutter 19 distanced from the discharge port 9. The shutter 19 is configured to be movable between a closed position in which build material is not dispensed onto the working surface 7, and an opened position in which build material is dispensed onto the working surface 7. The shutter is arranged to close/cover an adjacent area ahead (upstream) of the lower surface of the flattening member 11, in the closed position Advantageously, it may no longer be required to push remaining build material into waste bins, enabling a more efficient use of the build material. Hence, after the desired layer of build material is deposited on the working surface (e.g. on powder bed), the remaining heap of build material is not considered as a waste, but is kept intact by means of the shutter. Furthermore, the time required for building up the heap of build material by providing build material through the discharge port, can be avoided in successive runs. The additive manufacturing process may thus become faster in this way.

A hopper or a reservoir can be arranged for providing build material 5 to the discharge port 9 of the recoater 1. The flattening member 11 can be configured to relatively move with respect to the working surface 7 when a layer of build material 3 is provided on the working surface 7. By means of selective illumination of selected portions, a layer of an object can be hardened.

Figure 12:
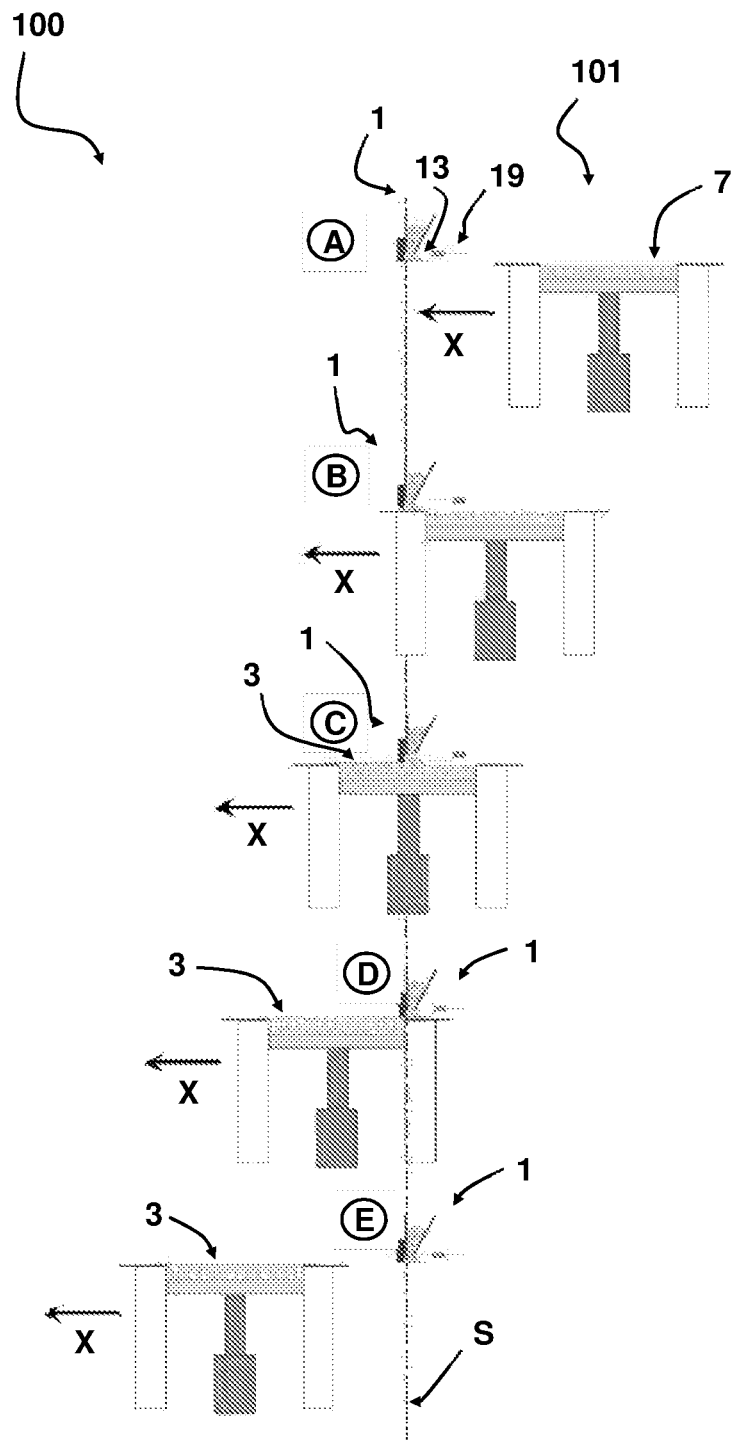
FIG. 12 shows a schematic diagram of an additive manufacturing system.

FIG. 12 shows a schematic diagram of an additive manufacturing system 100 including a build unit 101. The building unit 101 passed along the recoater 1 and different time steps are illustrated in FIG. 12. The build unit 101 can be moved by means of a conveyor. The recoater 1 may be stationary at a fixed position S, such that the relative movement between the recoater 1 and the working surface 7 on the build unit 100 is obtained by means of movement of the build unit 100.

The recoater 1 comprises a shutter 19 distanced from the discharge port 9. The shutter 19 is configured to be movable between a closed position in which build material is not dispensed onto the working surface 7 of the build unit 101, and an opened position in which build material is dispensed onto the working surface 7 of the build unit 101. The shutter 19 can be configured to close an adjacent area 21 ahead of the lower surface of the flattening member 11, in the closed position. In this way, the layer of build material can be selectively applied on the working surface 7 of the build unit 101.

In step A, the build unit 100 approaches the stationary recoater 1 in the running direction X. The shutter 19 of the recoater 1 is in a closed position, wherein a heap of build material 13 is resting on the shutter 19. In step B, the build unit 100 has reached the stationary recoater 1. The shutter 19 of the recoater 1 is then switched from the closed position to the opened position releasing the heap of build material. As a result, the layering process is initiated and a layer of build material is formed as the build unit is relatively moved with respect to the recoater 1. Subsequently, in step C, the recoater 1 passed across the working surface 7 with the shutter 19 remaining in the opened position. In step D, the stationary recoater 1 has reached a portion of the build unit 101 not requiring a layer of build material. At this point the shutter 19 is switched from the opened position to the closed position. In this way, the heap of build material 13 can remain substantially intact resting on the shutter 19. In step E, the build unit 101 has passed the recoater and the shutter remains in the closed position until initialization of a subsequent recoating process.

The build material may for instance be a powder. By means of the recoater, the powder can be layered to form a powder layer, wherein the powder of the powder layer is (selectively) bonded together to form a layer of the object. The layer of the object can be laminated on the previously formed layer of the object.

Figure 13:
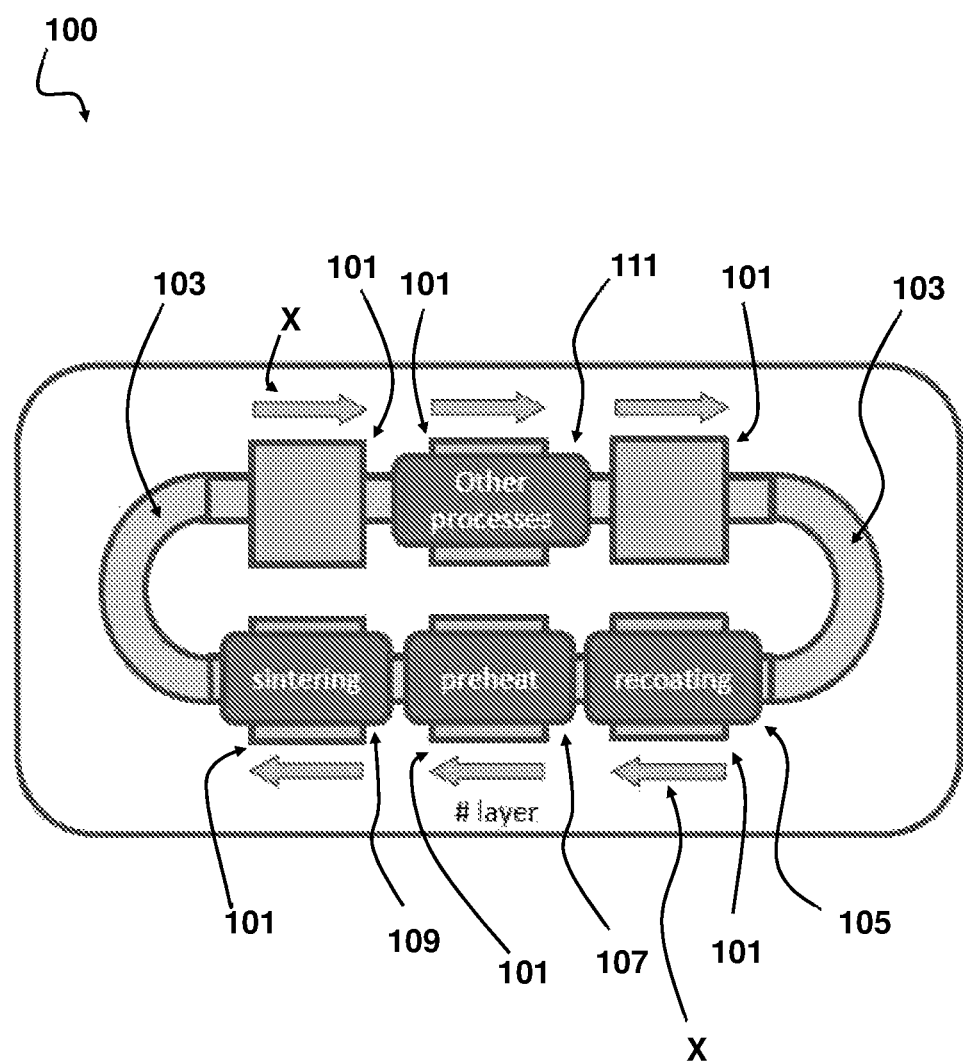
FIG. 13 shows a schematic diagram of a recoating process in an additive manufacturing system.

FIG. 13 shows a schematic diagram of a recoating process in an additive manufacturing system 100 including a conveyer 103 and a plurality of build units 101. The plurality of build units 101 are moveable along the conveyor 103. The system 100 further includes a recoater compartment 105. Within the recoater compartment a recoater 1 is arranged for providing a layer of build material onto the working surface of the build unit 101 passing therethrough, if desired. One or more of the plurality of build units 101 are arranged to subsequently pass along the recoater compartment 105 by means of the conveyor 103. In this exemplary embodiment, the additive manufacturing system 100 further includes a preheating compartment 107 and a subsequent solidification compartment 109, for example for sintering. One or more additional compartments 111 may be arranged, such as for example for postheating. The plurality of build units 101 are movable arranged such as to subsequently pass the compartments. Other compartments may also be arranged in the additive manufacturing system 100. Advantageously, the recoater 1 has a shutter 19 such that wasting of build material can be reduced.

The solidification process may require an elevated temperature. Additionally or alternatively, a vacuum may be required.

Figure 14:
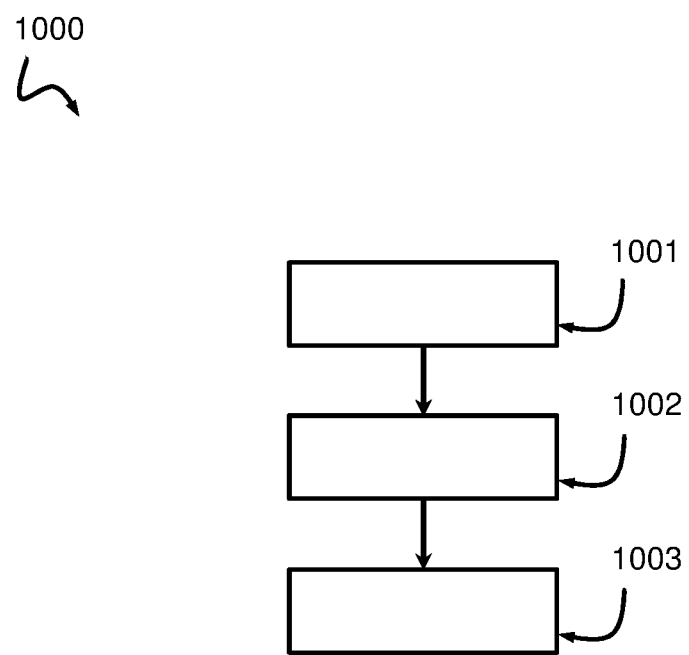
FIG. 14 shows a flow chart of a method.

FIG. 14 shows a flow chart of a method 1000 for applying a layer of build material capable of solidification on a working surface by means of a recoater, wherein the recoater comprises a discharge port and a flattening member. The recoater is provided with a shutter distanced from the discharge port, wherein the shutter is movable between a closed position in which build material is not dispensed onto the working surface, and an opened position in which build material is dispensed onto the working surface. In a first method step 1001, build material is discharged by means of the discharge port in order to form a heap of build material ahead of the flattening member. In a second method step 1002, material from the heap of build material is spread, by means of the flattening member, along the working surface in order to form the layer of build material on top of the working surface through a gap formed between a lower surface of the flattening member and the working surface by relative movement of the flattening member and the working surface. In a third method step 1003, the shutter is employed for selectively opening or closing an adjacent area ahead of the lower surface of the flattening member.

The method can be used in an additive manufacturing process for forming at least a portion of a three-dimensional object, wherein a subsequent layer of the three-dimensional object, having a layer thickness, is formed over a previously formed layer of the object.

The recoater 1 may include a primary reservoir and a second reservoir, wherein the primary reservoir is in communication with the secondary reservoir by means of the discharge port.

In an example, the recoater 1 is a powder spreading device configured to spread powder over a working surface 7 such as a build plate and/or on a previous layer. Material needed for forming the layer of build material 3 can be drained from the heap of build material 13 ahead (upstream) of the flattening member of the recoater 1 during relative movement between the recoater and the working surface 7.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A recoater for forming a layer of build material capable of solidification on a working surface, wherein the recoater comprises:
    a discharge port;
    a flattening member; and
    a shutter distanced from the discharge port,
    wherein the discharge port is configured to discharge a build material to form a heap of build material for subsequent spreading by the flattening member,
    wherein the flattening member is configured to spread material of the heap of build material along the working surface to form the layer of build material on top of the working surface, through a gap formed between a lower surface of the flattening member and the working surface, by relative movement of the flattening member and the working surface,
    wherein the shutter is configured to be movable between:
        a closed position in which build material is not dispensed onto the working surface, and
        an opened position in which build material is dispensed onto the working surface, and
    wherein the shutter is configured to close an adjacent area ahead of the lower surface of the flattening member in the closed position.

2. The recoater according to claim 1, wherein in the closed position the shutter is configured to carry the heap of build material.

3. The recoater according to claim 1, wherein in the closed position a lower surface of the shutter is aligned with respect to the lower surface of the flattening member.

4. The recoater according to claim 1, wherein the shutter is slidingly displaceable between the opened position and the closed position.

5. The recoater according to claim 1, wherein the shutter is switchable between the opened position and closed position, and/or vice versa, at least during relative movement of the recoater and the surface.

6. The recoater according to claim 1, wherein the shutter is switchable between the opened position and closed positon, and/or vice versa, at a speed larger or equal to a recoating speed.

7. The recoater according to claim 1, wherein the shutter is switchable between the opened position and closed position, and/or vice versa, with a speed equal to a recoating speed.

8. The recoater according to claim 1, wherein the recoater further includes a scraper having a raised edge,
    wherein the raised edge is arranged to scrape off build material resting on the shutter during retraction of the shutter from the closed position to the opened position.

9. The recoater according to claim 1, wherein the shutter includes a flexible film held by one or more ribs.

10. A method for applying, by a recoater, a layer of build material capable of solidification on a working surface, wherein the recoater comprises:
   a discharge port;
   a flattening member; and
   a shutter distanced from the discharge port,
wherein the method includes:
   discharging, by the discharge port, a build material to form a heap of build material for subsequent spreading by the flattening member,
   spreading, by the flattening member, material of the heap of build material along the working surface to form the layer of build material on top of the working surface through a gap formed between a lower surface of the flattening member and the working surface by relative movement of the flattening member and the working surface, wherein the shutter is movable between:
   a closed position in which build material is not dispensed onto the working surface, and
   an opened position in which build material is dispensed onto the working surface, and
   wherein the shutter is configured to close an adjacent area ahead of the lower surface of the flattening member in the closed position.

11. An additive manufacturing system including the recoater according to claim 1.

12. An additive manufacturing system including at least a conveyer, a plurality of build units moveable along the conveyor, and a recoater according to claim 1, wherein one or more of the plurality of build units are arranged to subsequently pass along the recoater by use of the conveyor.

13. The additive manufacturing system according to claim 12, further including a solidification chamber, and at least one of a preheating and/or postheating chamber, wherein the plurality of build units are movable to said chambers by the conveyor.

14. A method of layerwise forming an object from a medium capable of solidification, whereby the object is built up layer per layer by repeatedly providing a layer of the medium on a support and/or an already formed part of the object and by subsequently solidifying one or more predetermined areas of the layer of the medium according to a specific pattern before a successive layer is formed in a same manner, wherein the successive layers of medium are applied using a recoater according to claim 10.

\* \* \* \* \*